(12) United States Patent
Högberg et al.

(10) Patent No.: US 9,913,049 B2
(45) Date of Patent: Mar. 6, 2018

(54) METHOD OF SELF-TUNING THE VOLTAGE OF A RECHARGEABLE BATTERY OF AN ELECTRONIC DEVICE AND AN ELECTRONIC DEVICE OPERATING ACCORDING TO SUCH METHOD

(71) Applicant: SONOVA AG, Staefa (CH)

(72) Inventors: Jonas Högberg, Uerikon (CH); Sahba Aazami, Founex (CH)

(73) Assignee: Sonova AG, Staefa (CH)

( * ) Notice: Subject to any disclaimer, the term of this patent is extended or adjusted under 35 U.S.C. 154(b) by 34 days.

(21) Appl. No.: 15/099,395

(22) Filed: Apr. 14, 2016

(65) Prior Publication Data
US 2017/0303051 A1    Oct. 19, 2017

(51) Int. Cl.
*H02J 7/00* (2006.01)
*H02J 7/04* (2006.01)
*G01R 19/00* (2006.01)
*G01R 31/00* (2006.01)
*H04R 25/00* (2006.01)

(52) U.S. Cl.
CPC ............. *H04R 25/30* (2013.01); *H02J 7/007* (2013.01); *H04R 2225/31* (2013.01); *H04R 2225/33* (2013.01)

(58) Field of Classification Search
CPC ....... Y02E 60/12; H01M 10/44; H02J 7/0063; H02J 7/0065; H02J 2007/0067; H02J 7/007; H02J 7/0093; H02J 7/0075; H02J 7/0047; H02J 7/008; H02J 7/0031; H02J 7/0078; H04R 25/30; H04R 2225/31; H04R 2225/33; Y02T 10/7005; G01R 31/3648; G01R 31/3651; G01R 31/3624; G01R 19/0092; G01R 1/203; G01R 31/2642; G01R 31/026; G01R 31/041; G06F 9/3802; G06F 2221/2137; B61L 5/1881; B61L 2207/02; H05B 33/0815
USPC ...... 320/130, 132, 135, 149; 324/76.11, 500
See application file for complete search history.

(56) References Cited

U.S. PATENT DOCUMENTS

| 6,486,635 | B1 * | 11/2002 | Matsuda | G01R 19/16542 320/128 |
|---|---|---|---|---|
| 7,999,515 | B2 | 8/2011 | Elias et al. | |
| 2008/0054847 | A1 * | 3/2008 | Elias | G01R 31/3627 320/130 |
| 2012/0038316 | A1 * | 2/2012 | Elias | G01R 31/3627 320/107 |
| 2015/0321576 | A1 * | 11/2015 | Lee | H02J 7/044 701/22 |
| 2015/0349548 | A1 * | 12/2015 | Muralidhar | H02J 7/007 320/162 |

* cited by examiner

*Primary Examiner* — Yalkew Fantu
*Assistant Examiner* — Mohammed J Sharief (57) ABSTRACT

An exemplary method of compensating for a circuit offset error to a measure of a battery voltage of a rechargeable battery of an electronic device is described wherein the battery powers an electronic circuitry of the device and the electronic circuitry introduces the circuit offset error to the measure of the battery voltage. A corresponding electronic device is also described.

11 Claims, 5 Drawing Sheets

METHOD OF SELF-TUNING THE VOLTAGE OF A RECHARGEABLE BATTERY OF AN ELECTRONIC DEVICE AND AN ELECTRONIC DEVICE OPERATING ACCORDING TO SUCH METHOD

BACKGROUND INFORMATION

Hearing aids normally comprise at least one microphone as acoustic input element; at least one speaker as acoustic output element; and an electronic processing element, connected with said microphone and said speaker, for the processing and manipulation of electronic signals. This electronic processing element may comprise analogue or digital signal processing devices. Said elements are usually arranged within at least one main case or shell of the hearing device.

Typically, the microphone acts as an electroacoustic transducer and receives acoustic signals, converts such signals into electrical signals and transmits them to the abovementioned electronic processing element.

The electronic processing element is part of a signal processing circuit which, normally, performs various signal processing functions. Such signal processing functions can include amplification, background noise reduction, beam-forming, feedback cancelling, frequency lowering, sound type classification, tone control, etc.

Normally, the signal processing circuit outputs an electrical signal to a speaker. The speaker acts as an electroacoustic transducer and converts the electrical signal from the signal processing circuit into an acoustic signal which is transmitted as audio into a user's ear. For a cochlea implant, the transducer is replaced by a set of electrodes which deliver electrical impulses directly to the hearing nerve.

For the sake of reliability, safety and efficiency in use of electronic devices, such as of hearing aids, an intelligent battery management is desirable. Especially in case of rechargeable batteries, it is desirable to manage rechargeable batteries in a way that not simply the battery lifespan is maximized, but also the usage in between successive charging cycles is adaptively rationalized, in compliance with the current situation.

Particularly for rechargeable batteries, an effective battery management is dependent on a best possible measurement of the state of charge of the power storage means employed, that is of the percentage of charge remaining.

Poor estimates of such state of charge may lead to over-charging or over dis-charging, ultimately resulting in reduced battery lifetime and usage performance. Charging not in line with the current state of charge or based on erroneous estimates thereof may eventually cause breakdown, overheating and uncontrolled venting of the power storage means, up to explosion.

It is known, in the prior art, relating the charge remaining accumulated in power storage means to voltage measurements at the terminal of such power storage means. Thus, measurements of the terminal voltage are used to calculate the remaining charge level, or capacity, of power storage means.

On the other hand, even though the correlation between voltage and state of charge of the power storage means is strong—for instance, for Li-Ion batteries—, voltage correlation techniques still suffer from conversion inaccuracies. In particular, the electronic circuitry of the electronic devices in question can itself introduce circuit offset errors to the measure of the voltage of power storage means.

Such voltage offset errors, inherent to the electronic circuitry, can have a significant impact on the measurement of voltage and need to be taken into account, and compensated for, when trying to determine the actual remaining charge level, or capacity, of power storage means. If the offset voltage error is not tuned, or is wrongly tuned, an estimate of the state of charge of a battery can be easily off by 20%.

U.S. Pat. No. 7,999,515 B2 discloses a system for operating a rechargeable battery which takes into account an offset error when charging said battery to a predetermined maximum voltage.

The calibration process as described in U.S. Pat. No. 7,999,515 B2 adopts a traditional approach, by performing the calculation of the offset error to be compensated for while the battery is connected to an external power supply, charging the battery via a charge controller. The calculation of the offset error according to U.S. Pat. No. 7,999,515 B2 is carried out under conditions wherein there is virtually no load on the rechargeable battery. A known, explicitly predetermined maximum voltage is therefore applied to the rechargeable battery while an external power supply is made available.

The calibration process described in U.S. Pat. No. 7,999,515 B2 is suitable for conventional operations aimed at measuring and characterizing a tuning parameter for compensation of a voltage-offset error already at a testing phase or anyway at a stage substantially integral with the production steps. Testing and/or production typically happen at the hand of an electric device manufacturer.

Such a tuning adds to the overall complication and lengthiness of production procedures encountered by an electric device manufacturer. Moreover, such a tuning is disconnected from the actual conditions under which the electric devices—provided with the rechargeable batteries whose state of charge is to be gauged—are going to be employed by the end users.

There exists a need for a method of self-tuning the voltage of a rechargeable battery of an electronic device, and for a corresponding electronic device comprising a system for operating a rechargeable battery according to such method, which is conceived in a way that 1) the tuning can be effectively carried out without the need for the electronic device to be powered during charge via a microcontroller or similar; 2) the tuning does not have to rely on the actual, preventive knowledge of a specific predetermined voltage to be applied to the rechargeable battery and on the detection of charging currents to be delivered to the battery until predetermined charging current levels are reached; 3) the tuning does not complicate the electric device production processes; and 4) the tuning is reflective of actual operating conditions of the electronic devices.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

The present methods, devices, and systems relate generally to electronic devices powered by rechargeable power storage means, such as by rechargeable batteries or battery cells, and particularly to wearable electronic devices, like hearing devices, using rechargeable power storage means. In the following, the terms "power storage means" and "battery" will be substantially used synonymously.

The present methods, devices, and systems deal with a method of tuning the voltage of rechargeable power storage means powering electronic devices as above introduced, as well as with electronic devices comprising a voltage tuning system operating according to such method.

More specifically, the methods, devices, and systems are designed to achieve a self-tuning of the voltage of rechargeable power storage means by taking into account, and compensating for, a circuit offset error to the measure of said voltage as introduced by an electric circuitry of electronic devices. The step of tuning the voltage of rechargeable power storage means—essential to obtaining reliable data on the state of charge of said power storage means in use —can therefore be transferred to a phase successive to production of the wearable digital devices which incorporate the rechargeable power storage means in question, in a way that best reflects the given battery charge situation and contextually optimizes the usage per charging cycle of the rechargeable batteries.

The present methods, devices, and systems, which will be presented in detail in connection with hearing aids, can be arranged to be applied also to other kinds of electronic devices, in particular to wearable devices, e.g. to devices for monitoring fitness or for managing busy schedules, to smart watches, to media players or similar.

The electronic devices provided with a voltage self-tuning system according to the present methods, devices, and systems described herein may be, but are not limited to, digital, in that the electronic circuit thereof comprises at least a portion of the components which is digital.

As used herein, the term hearing aid shall be understood as a device to be worn at the vicinity or directly within the ear of a person to support and/or to improve the individual hearing capacity of this person. Such an improvement may include the prevention of the receiving of certain acoustic signals in terms of ear protection. Hearing aids can therefore be provided with different types of earpieces for coupling to the ear and/or to the ear canal of a hearing aid user; with earplugs; with headsets or similar.

In relation to their application and user indication, and according to the corresponding main solutions available on the market, such hearing devices can be worn, for instance, behind the ear (BTE), within the ear (ITE) or completely within the ear canal (CIC). The latest design developments have made available hearing devices that are even smaller than completely within the ear canal (CIC) devices, aptly named invisible in the canal (IIC) hearing aids.

It will be recognized that the features of the present methods, devices, and systems are substantially compatible with any style of hearing aids, including the above mentioned models, as well as with hearing aids which are eyewear-mounted, implanted, body-worn, etc.

An exemplary feature of the present methods, devices, and systems is to provide a method for correctly and realistically estimating the circuit offset error introduced to the measure of a battery voltage.

Another exemplary feature of the present methods, devices, and systems is to make the final steps of production and testing, by an electric device manufacturer, speedier and less cumbersome.

Yet another exemplary feature of the present methods, devices, and systems is to transfer the tuning of the voltage of rechargeable batteries of electronic devices, such as hearing aids, to the moment when the electronic devices are actually handled and operated by the final users, under actual usage conditions.

These problems are solved through a method of self-tuning a voltage of a rechargeable battery, and a correlated electronic device comprising a voltage tuning system configured to operate according to such method, in compliance with the claims.

The inventive solution basically includes iteratively measuring a supply voltage to an electric device over a series of booting operations, in connection with the turning on and the booting of the electronic device by an end user.

The design of a self-tuning method for the voltage of a rechargeable battery according to the present methods, devices, and systems allows to effectively and smoothly achieve a reliable convergence to a correct circuit offset error estimate which best reflects the operative conditions of electronic devices, as they are actually employed by of end users.

Figure 1:
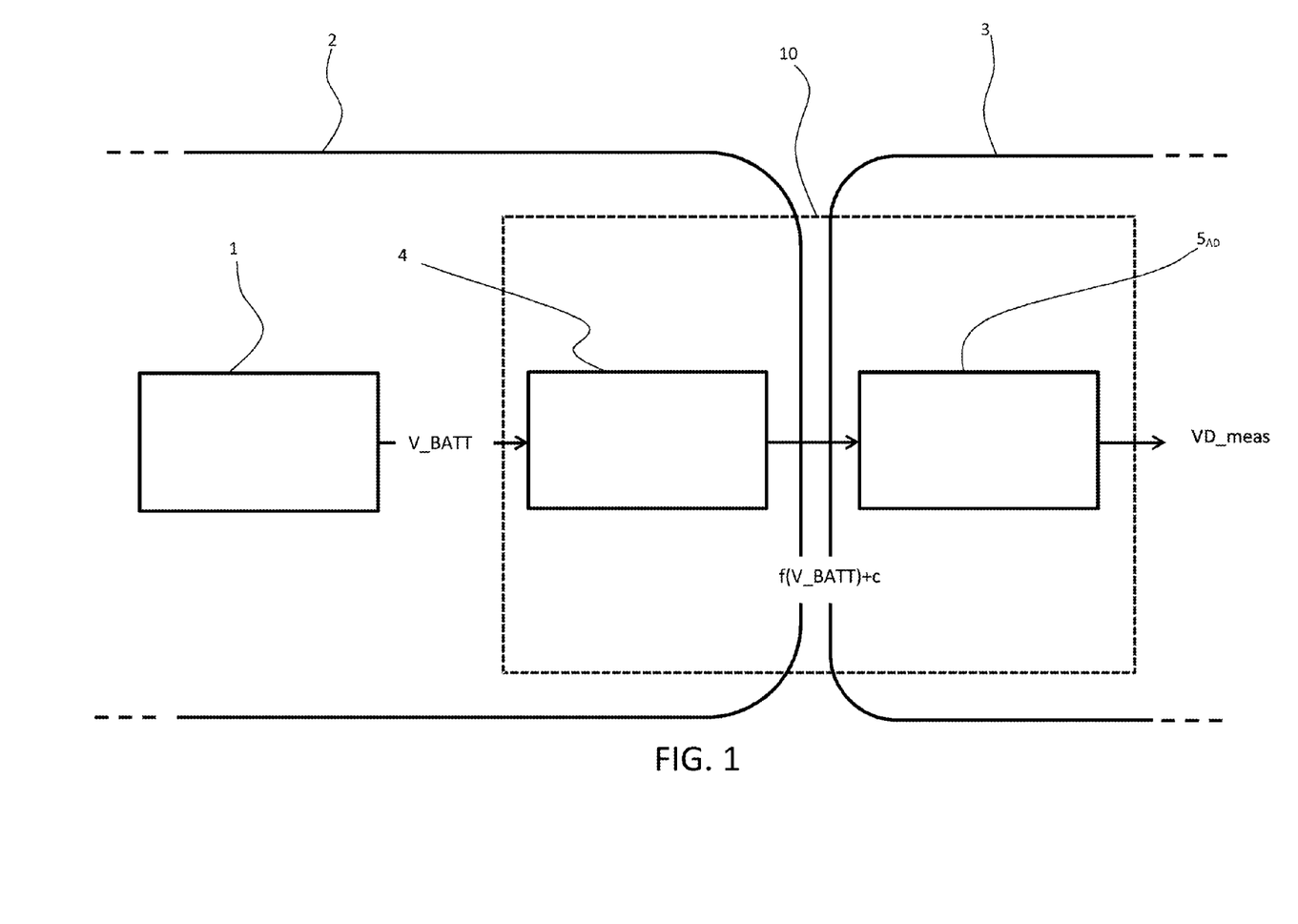
FIG. 1 is a schematic, partial representation of a power storage means, in the form of a battery, powering an electric circuitry of an electric device, showing how components of such electric circuitry introduce a circuit offset error to the measure of the supply voltage applied to the electric device.

Other feature and advantages of the present methods, devices, and systems will be now described in greater detail with reference to specific embodiments represented in the attached drawings, wherein:

With reference initially to the schematic representation of FIG. 1, the electronic circuitry 10 of an electronic device D is powered by a rechargeable power storage means, such as a battery 1.

The electronic circuitry 10 may in general comprise a multiplicity of components which can be respectively part of different modules and units of an electronic device D.

For instance, the electronic circuitry 10 may comprise a voltage regulator 4, part of a power module 2 of the electronic device D. The electronic circuitry 10 may also comprise an analog to digital converter $5_{AD}$, incorporated in an electronic processing unit 3 of the electronic device D.

The voltage regulator 4 may be, for instance, a DC-to-DC converter.

In FIG. 1, according to the methods described herein, it is exemplified the assumption of a nominal voltage value V_BATT for the battery 1 at full charge, as well as that of a correlated output function of the battery voltage at full charge, f(V_BATT).

In FIG. 1, it is also exemplified how the electronic circuitry 10—or components thereof—normally introduces a circuit offset error c to the measure of the battery voltage, so that the supply voltage VD_meas to the electric device D is actually affected by such circuit offset error c. Relatively to the exemplifying set-up used in the representation of FIGS. 1 and 2, the circuit offset error c may be attributed to the voltage regulator 4 and to the analog to digital converter $5_{AD}$.

Figure 2:
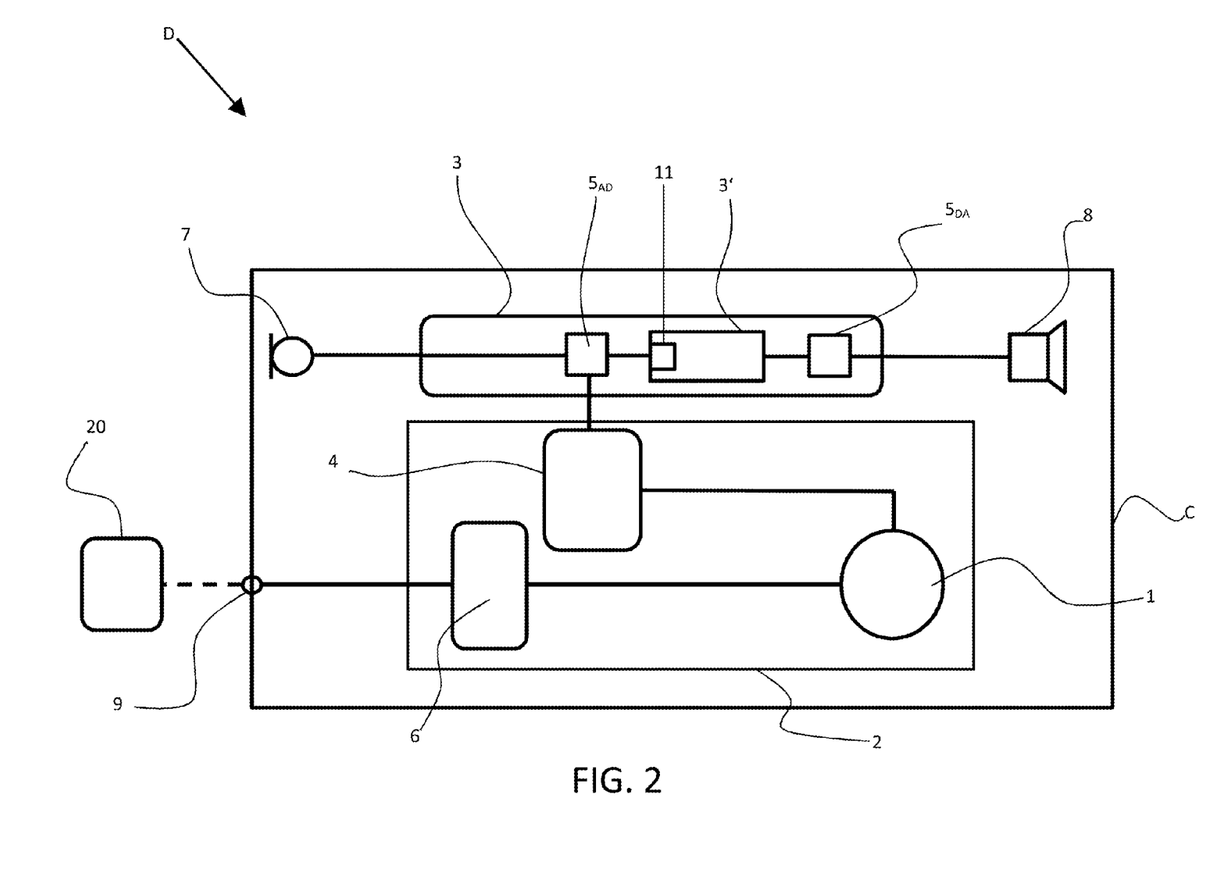
FIG. 2 is a schematic circuit diagram exemplifying the case wherein the electric circuit of FIG. 1 is integrated into a hearing aid powered by rechargeable batteries.

In embodiment of FIG. 2, an electronic device according to the present methods, devices, and systems can take the form of a hearing aid D, integrating an electronic circuit 10 as schematized in FIG. 1 and powered by a rechargeable power storage means, such as a battery or cell 1, not needing to be removed from the hearing aid in order to be recharged.

A voltage tuning system according to the present methods, devices, and systems can be integrated to the electronic circuitry 10 of the hearing aid D, so that the hearing aid D can self-tune the voltage of the rechargeable power storage means 1 by execution of a sequence of steps that will be in the following illustrated.

A casing C of the hearing aid D accommodates a multiplicity of electric components. According to the terminology commonly employed in the hearing aid technical field, a casing C can alternatively be designated as a shell, especially in the case of ITEs, CICs and IICs.

Such casing C can accommodate a first electroacoustic transducer 7, working as a microphone for converting sound waves into electrical signals; and/or a second electroacoustic transducer 8, working as a receiver or speaker for converting electrical signals into sound waves compatible with human hearing. The ensuing acoustic signal is optimized for transmission into a hearing aid user's ear.

For a cochlear implant, the second electroacoustic transducer is replaced by a set of electrodes which deliver electrical impulses directly to the hearing nerve.

The electronic circuitry 10 comprises a specific electronic processing unit in the form of a signal processing unit 3, configured to receive from the microphone 7 an electrical input signal and to provide the receiver 8 with a corresponding electrical output signal. The signal processing unit 3 can perform various signal processing functions. Such signal processing functions can include amplification, background noise reduction, beamforming, feedback cancelling, frequency lowering, sound type classification, tone control, etc.

In today's digital hearing aids, the signal processing unit 3 can comprise a digital signal processor 3' (also designated DSP) and cooperate with a memory for storing and retrieving data.

Such digital signal processor 3', or DSP, can be programmed to execute the functional tasks of dedicated signal processing algorithms. The DSP can operate according to several different algorithms comprising respective systems of instructions, rules and parameters for performing specific tasks relative to the processing of the input signal. Thanks to such algorithms, the signal can be manipulated to more closely comply with the acoustic needs of a user and in modern hearing aids not only amplification for compensating a hearing loss, filtering and compression are enabled, but also more complex functions are made possible, such as adaptive directional functions for reducing the sound levels from the sides and rear, automatic mode switching dependent on the nature of the input sound or calibration based on measurements for better fitting to the individual ear.

In order to execute the above signal processing algorithms, the programmable digital signal processor 3' generally cooperates, in operation, with a non volatile memory for storing and retrieving data. Such data can comprise setting, measurement or calibration parameters and characteristics to be taken into account in executing the step-by-step set of signal processing operations performed by the DSP, and in general the set of rules and instructions corresponding to the signal processing algorithms, commonly designated as firmware.

Internal power storage means 1 are generally configured to provide power to electric transducers 7, 8 and to the signal processing unit 3 at least during the ordinary use of the hearing aid D, that is whenever the hearing aid is worn by a user.

A hearing aid D may additionally comprise means for receiving power 9 from an external power source 20. An external power source 20 to be coupled to a hearing aid D can take the form of a charging station or of a network mains or of a charging device, for instance battery-driven or solar energy-driven. In the case of external power source 20 incorporated in a charging device, the charging device can also be hand-held by a user. Moreover, said means for receiving power 9 can be adapted depending on the technology used for transferring power from an external power source 20 to the hearing aid D in order to charge its batteries and/or run its signal processing means. In fact, the means for receiving power 9 can comprise means for establishing a releasable, wired electrical connection between the hearing aid D and the external power source 20. In another embodiment, if an electromagnetic field is employed, means for receiving power 9 can be configured for supporting wireless charging, for instance by incorporating induction coils. A charging circuitry 6 for recharging a battery 1 from the external power source 20 may be designed to handle the power requirements for correctly and effectively recharging the battery 1.

In the embodiment of FIG. 2, the electronic circuitry 10 comprises for instance a voltage regulator 4 as part of a power module 2 of the hearing aid D. In fact, depending on the type of batteries or of fuel cells 1, and on the current operation to be performed, the suitable supply voltage might change and may be adjusted thanks to such voltage regulator 4. The voltage regulator may come in the form of a DC-to-DC power converter.

As evident in the scheme of FIG. 2, a signal processing unit 3 may also comprise an analog to digital (A/D) converter $5_{AD}$, to convert an analog signal to its digital equivalent, possibly already at the microphone stage; and, after the digital signal processor 3' has performed its tasks, a digital to analog (D/A) converter $5_{DA}$, to convert the digitized signal back to its analog equivalent. The receiver 8 can also integrate the latter function of accomplishing digital to analog conversion.

Due to the fact that, as explained, certain components of the electronic circuitry 10—such as the abovementioned voltage regulators and analog to digital converters—introduce a circuit offset error to the measure of the voltage of the power storage means 1, an electronic device D is provided with a voltage tuning system. Such voltage tuning system may be coupled with the electronic processing unit 3 and can comprise hardware components, such as detection units, and software components, such as control and measurement software modules.

For the hearing aid D of FIG. 2, the voltage tuning system cooperates and may be coupled with the signal processing unit 3. Thus, the voltage tuning system may be accordingly integrated with the digital signal processor 3'.

A method of self-tuning the voltage of a rechargeable power storage means 1, such as batteries or fuel cells, relies on determining and taking into account a circuit offset error c to the measure of said voltage as introduced by an electronic circuitry of the electric device D which is powered by said rechargeable power storage means.

The method comprises the preliminary step of assuming a nominal value for the battery voltage at full charge, V_BATT, and a correlated output function of said battery voltage at full charge, f(V_BATT), as shown in FIG. 1. At this stage, such assumption gives a fair estimation of the abovementioned values. In order to successfully implement the steps of the present iterative method, it is not required to actually preventively charge the battery, via a microcontroller, to reach a certain predetermined maximum voltage. It will simply be relied on the assumption that, at a given stage during its usage, the electronic device D will have eventually been fully charged.

Based on the above assumption, the method described herein comprises the step of iteratively measuring a supply voltage VD_meas to the device D, over a series of booting operations of said device D.

Figure 3:
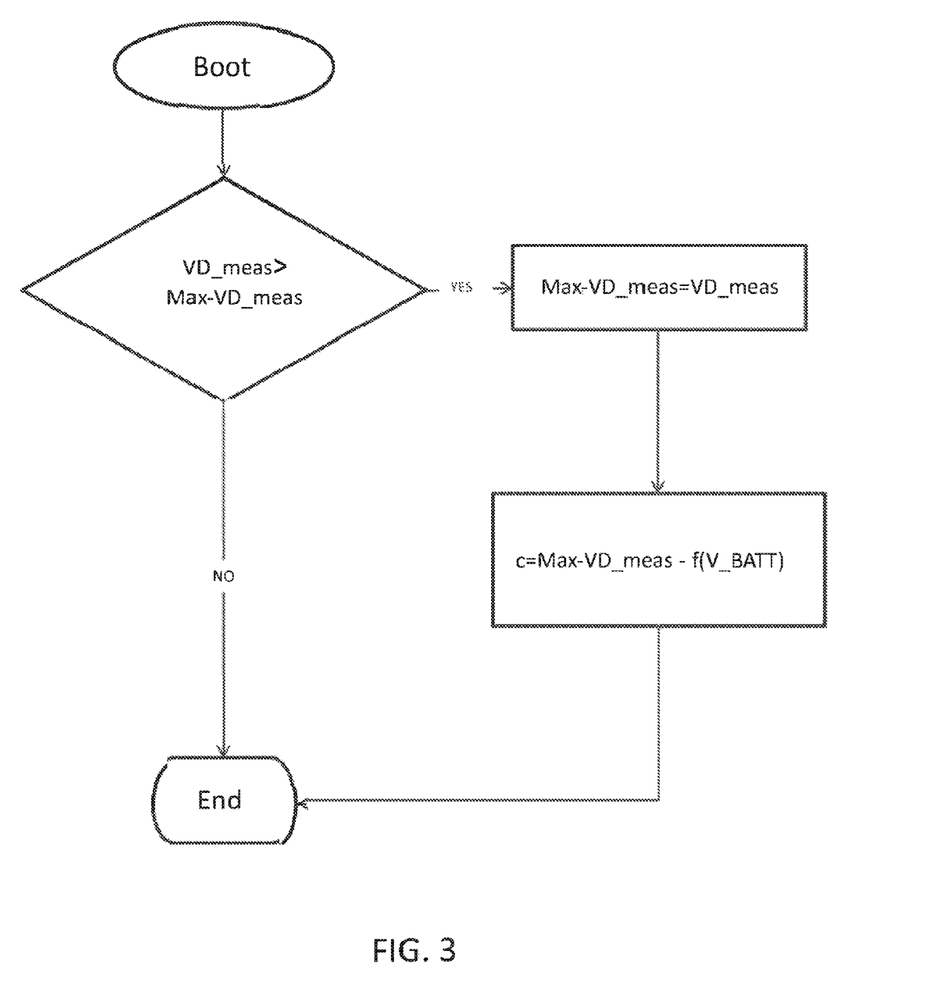
FIGS. 3-5 are work-flows schematically illustrating the sequence of operations for respective three embodiments of the method described herein, allowing to reliably and effectively arrive at a correct estimate of a circuit offset error.

With reference to FIG. 3, the method comprises, for each booting operation, the step of first turning on and booting the electronic device D. This operation may be executed by the individual who is going to use the electronic device, for instance directly by the user of a hearing aid.

The method described herein comprises the further step of measuring, for a new booting operation, a respective new value of supply voltage VD_meas to the device D.

Such a measuring of the supply voltage VD_meas output to the device D can be carried out by a voltage detection unit 11 of the voltage tuning system.

The voltage detection unit 11 may be part of the electronic processing unit 3 and in operative connection with the components of the electronic circuitry 10 which introduce an offset error to the measure of the battery voltage; in both embodiments of FIG. 1 and FIG. 2, such components are deemed to be a voltage regulator 4 and an analog to digital (A/D) converter $5_{AD}$.

A control and measurement software module of the voltage tuning system, which may be running over the electronic processing unit 3, uses the above supply voltage values VD_meas—iteratively measured for each subsequent booting operation—to substantially determine the circuit offset error c whose knowledge is crucial to construing a correct battery state of charge, or, otherwise expressed, a correct state of charge of the power storage means 1.

The algorithm implemented according to the present methods, devices, and systems instructs that, if the newly measured value of supply voltage VD_meas to the device D is larger than the maximum of values, Max-VD_meas, of such supply voltage measured in connection with previous booting operations, the newly measured value of supply voltage VD_meas will be stored as new maximum value of the supply voltage Max-VD_meas.

If, instead, the newly measured value of supply voltage VD_meas to the device D is smaller than the maximum of values, Max-VD_meas, of such supply voltage measured in connection with previous booting operations, the algorithm instructs that the maximum of values, Max-VD_meas, of the supply voltage measured in connection with previous booting operations will not change and will be stored for use in a next iteration.

After one of the above mutually exclusive conditions has been verified, the method described herein comprises the step of calculating the circuit offset error c as the difference between the maximum value of the supply voltage, Max-VD_meas, over the entirety of said series of booting operations; and the value, initially assumed, of the output function of the battery voltage at full charge, f(V_BATT).

The above method can also be modified by incorporating a check on the number of charging cycles undergone by the power storage means 1. Such a check can be carried out by charging cycle detection means, for instance integrated in the charging circuitry 6, which transfer information on the number of charging cycles undergone from the power module 2 to the electronic processing unit 3, namely to the control and measurement software module of the voltage tuning system. It can be assumed that, after a minimum number of charging cycles, the electronic device D has been fully charged.

Analogously to detecting the number of charging cycles already happened in between a series of booting operations, a check aimed at reasonably ensuring that the electronic device D has been fully charged can also be set up by taking into consideration the detected hours of usage of the electronic device. In the latter case, it is expected that, after a minimum number of usage hours, the device will have been fully charged to an assumed, nominal value of the battery voltage V_BATT. In some specific embodiments, it can be assumed that a booting operation coincides with a full charge-discharge cycle; in this case, checking on the number of charging cycles undergone by the power storage means 1 substantially equals keeping track of the number of booting operations.

Therefore, the method described herein can comprise the steps of detecting the number n of charging cycles that the digital device D has undergone at a respective booting operation, after turning on and booting the device D, and assessing whether said number n exceeds a set minimum number of charging cycles n*. Beyond such minimum number of charging cycles n*, it is assumed by the present method that the device D has been fully charged.

This step of charging cycle detection can be carried out at different stages with respect to the above described steps of measuring a new value of supply voltage VD_meas for each booting operation.

With reference to the specific embodiment of FIG. 4, if it is established that the number n of charging cycles does not exceed, or equals, a set minimum number of charging cycles n*, said step of iteratively measuring a new value of supply voltage VD_meas to the device D is further performed as follows.

If the new measured value of supply voltage VD_meas to the device D is larger than the maximum Max-VD_meas of values of the supply voltage measured in connection with previous booting operations, the newly measured value of supply voltage VD_meas is stored as new maximum value of the supply voltage Max-VD_meas.

If, instead, said newly measure measured value of supply voltage VD_meas to the device D is smaller than the maximum Max-VD_meas of values of said supply voltage measured in connection with previous booting operations, the maximum Max-VD_meas of values of the supply voltage measured in connection with previous booting operations is kept stored for use in a next iteration.

On the other hand, if it is established that the number n of charging cycles exceeds a set minimum number of charging cycles n*, a further iteration of measuring a new value of supply voltage VD_meas to the device D, for a respective, successive booting operation, is skipped. In this instance, in fact, the circuit offset error c is directly calculated as the difference between the maximum value of the supply voltage Max-VD_meas over the overall, executed series of booting operations (encompassing the n* charging cycles); and the assumed output function of the battery voltage at full charge f(V_BATT).

Figure 5:
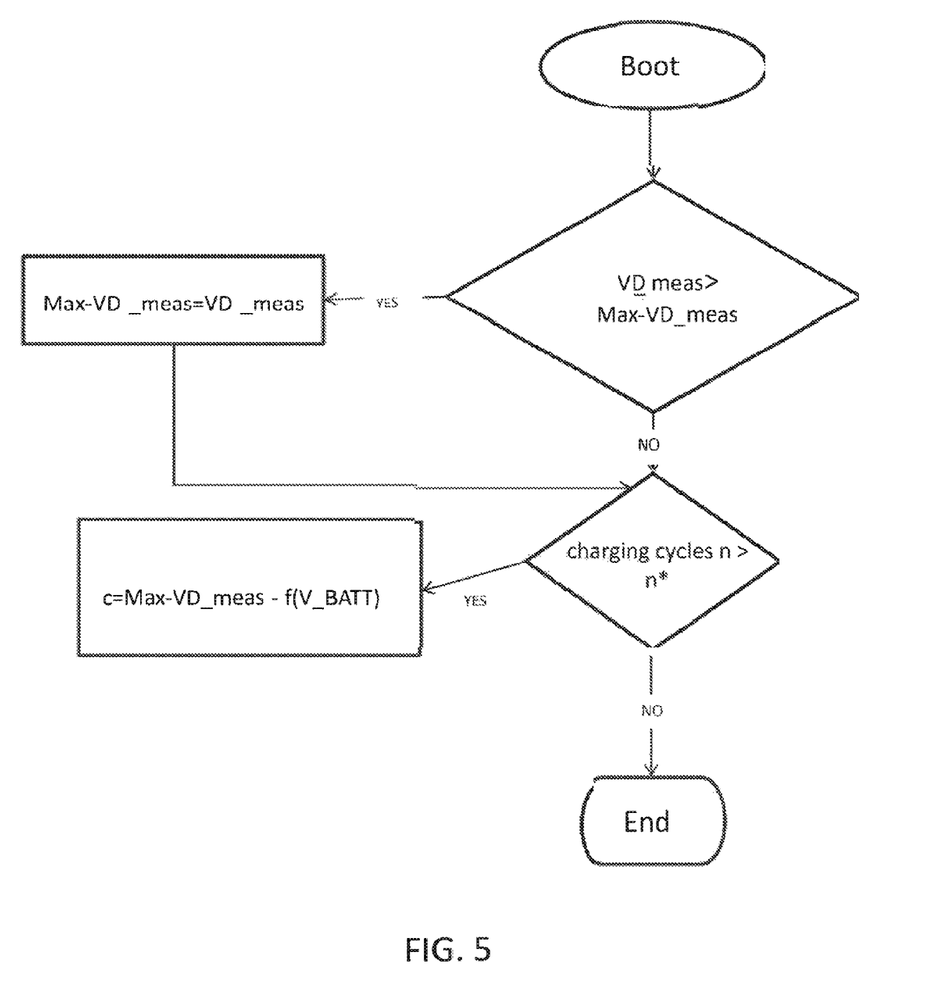

With reference to the specific embodiment of FIG. 5, instead, the detection of, and the assessment on, the number n of the charging cycles is carried out at the end of the iterative measuring process for calculating a supply voltage VD_meas to the electronic device D, and before performing the calculation of the circuit offset error c.

In this case, if the number n of charging cycles is less than, or equals, said set minimum number of charging cycles n*, the circuit offset error is not yet calculated and the iterative measuring process to newly derive a supply voltage VD_meas to the electronic device D is further carried out, in connection with a subsequent booting operation.

If, instead, the number n of charging cycles exceeds the set minimum number of charging cycles n*, the iterative measuring process is stopped. At this stage, the circuit offset error c is calculated as the difference between the maximum value of said supply voltage Max-VD_meas over said series of booting operations; and the abovementioned output function of the battery voltage at full charge f(V_BATT). The value of the offset error c so calculated and selected is to be used for future operation of the electronic device D. Intermediate calculation of an offset error c in connection with a number of charging cycles n inferior to the minimum number of charging cycles n* may not be performed, thus making the process more reliable and speedier.

The circuit offset error c so calculated, key to self-tuning the voltage of the rechargeable power means 1, can be assumed constant over the complete voltage range. Any deviation from the nominal value of the battery voltage at full charge can thus be regarded as an offset.

The method described herein may comprise the step of setting an initial value of supply voltage VD_meas, before any measuring thereof is executed, to a pre-set trial value and/or to zero.

When the circuit offset error c has been calculated, based also on the nominal value for the battery voltage at full charge V_BATT, the rechargeable power storage means 1 of the electronic device D can be self-tuned and the actual state of charge of the power storage means can be correctly derived. Without a calculation of the circuit offset error c as described, an estimate of the battery state of charge would remain inaccurate.

Figure 4:
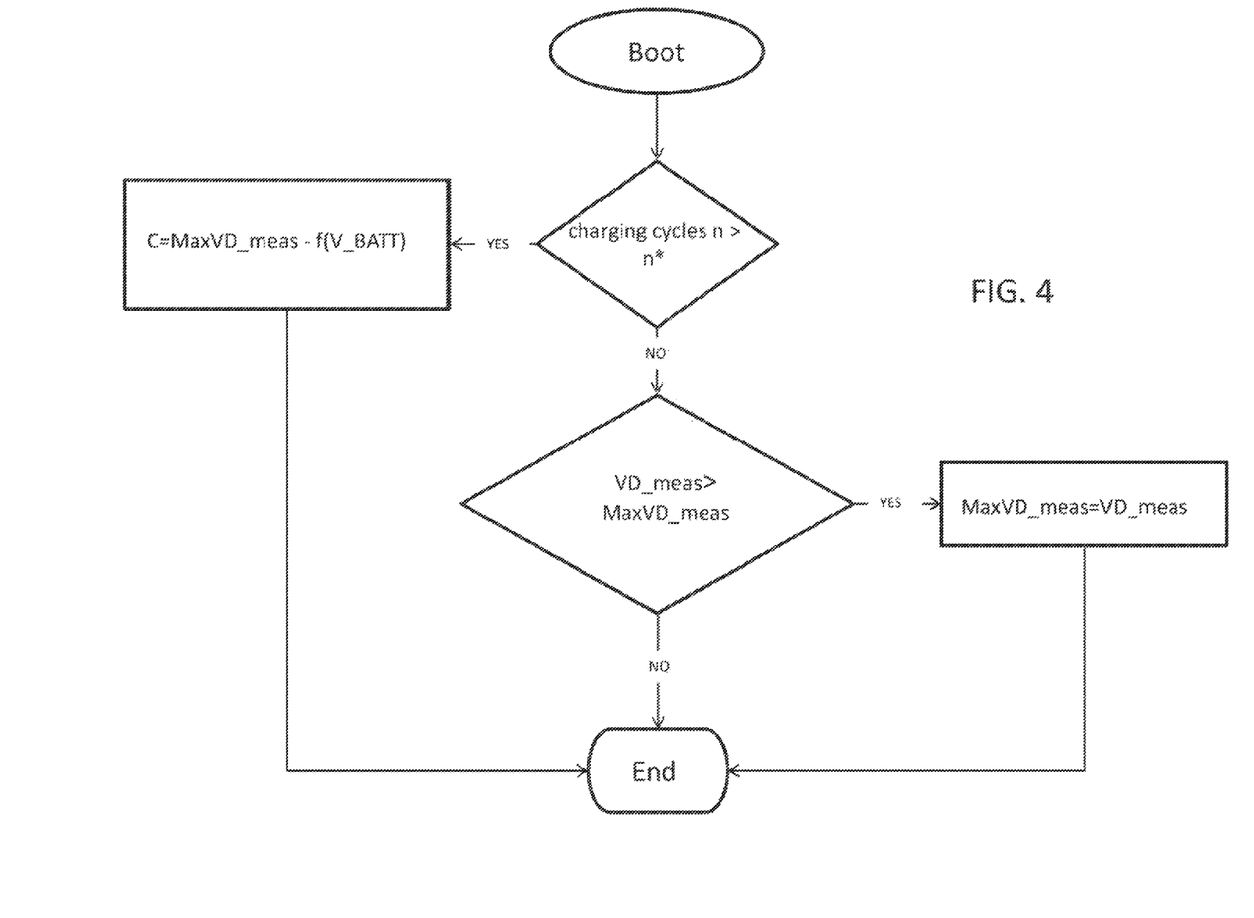

By way of example, and referring to the embodiment of FIG. 4, a battery voltage at full charge V_BATT can be assumed of 4.1 V; and an initial value of supply voltage VD_meas, before any measuring thereof is executed, can be set to equal to zero. A user of the device D can turn on and boot the device D. The voltage tuning system, by way of a voltage detection unit 11, would for instance measure a VD_meas of 1170 mV, bigger than the initially set value of zero. The method described herein would store, via a dedicated software module, the new value of supply voltage VD-meas as the new maximum value of supply voltage Max-VD_meas, at 1170 mV.

At this stage, the circuit offset error c is assumed still unknown.

In between booting operations, the user would charge the device D. It is preliminarily assumed that, for instance, after three charging cycles, the device will be fully charged.

At a subsequent booting operation, a charging cycle detection means would detect that the condition for a set minimum number of charging cycles where n* exceeds 3 is not yet met and a further step of measuring a new value of supply voltage VD_meas would be performed, yielding, for example, a value of the supply voltage VD_meas equal to 1206 mV. As the latter value of VD_meas at 1206 mV is larger than the previously stored value, such value is stored as a new maximum value of the supply voltage Max-VD_meas.

At next booting operation, it could for example be detected that the given condition for a set minimum number of charging cycles n* is still not met, thus a new value of voltage supply VD_meas is measured. The result can, for instance, output a value of 1180 mV for VD-meas, which is smaller than the maximum value of the supply voltage Max-VD_meas previously stored: the maximum value of the supply voltage Max-VD_meas is kept at 1206 mV.

By iteratively repeating the process over a series of booting operations, it will come to a point in time when it will be detected a number of charging cycles occurred since the very first booting that is equal to four, which exceeds the set minimum number of charging cycles n* of three.

At this stage, when it can be concluded that the device has been fully charged, the circuit offset error c can be derived as the difference between the current Max-VD_meas value and the known output function f(V_BATT).

If the stored Max_VD_meas value over the full series of booting operations executed has stayed the above 1206 mV, for instance, and based on the knowledge that f(4.1) equals 1212 mV, then the voltage tuning system described herein would yield a value for c of −6 mV.

The present methods, devices, and systems also relate to an electronic device D, powered by a rechargeable power storage means 1, further comprising a voltage tuning system especially configured to carry out the method above described.

As already illustrated, such voltage tuning system may comprise a voltage detection unit 11 for measuring of a supply voltage VD_meas of the rechargeable power storage means 1 to the device D. The voltage detection unit 11 is in operative connection with components 4, $5_{AD}$ of the electronic circuitry 10 of the device D introducing a circuit offset error c to the measure of the supply voltage VD_meas (e.g., downstream of them in the circuitry disposition). The voltage detection unit 11 cooperates with an electronic processing unit 3 of the device D to calculate the circuit offset error c, according to the algorithm above introduced.

The voltage tuning system can also comprise a charging cycle detection means, for instance in the charging circuitry 6, to detect number of charging cycles undergone by the rechargeable power storage means 1. The relative charging cycle number information can be transferred to the electronic processing unit 3 of the device D, to be taken into account in the calculation of the circuit offset error c.

The electronic device can be a hearing aid D (for example, but not limited to, a digital hearing aid, which may be, for instance, powered by at least a Li-Ion battery).

In such case, the signal processing unit 3 comprises a digital signal processor 3' programmed to execute the steps of the above method, in cooperation with the voltage detection unit 11 and, if provided, with charging cycle detection means.

By self-tuning the voltage of a rechargeable power storage means, the usage thereof per charging cycle can be maximized, thereby allowing a safe, efficient and reliable use of a device powered by such rechargeable power storage means in between charging operations.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method of compensating for a circuit offset error to a measure of a battery voltage of a rechargeable battery of a hearing aid, wherein the battery powers an electronic circuitry of the hearing aid, the electronic circuitry introducing the circuit offset error to the measure of the battery voltage, the method comprising:
assuming a nominal value for the battery voltage at full charge (V_BATT) and a correlated output function of the battery voltage at full charge (f(V_BATT));
iteratively measuring a supply voltage (VD_meas) to the device over a series of booting operations of the device, comprising for each booting operation the steps of:
turning on and booting the hearing aid;
measuring, with a voltage detection unit, a new value of the supply voltage (VD_meas) to the device, wherein
if the new measured value of supply voltage (VD_meas) to the device is larger than a maximum (Max-VD_meas) of values of the supply voltage measured in connection with previous booting operations, storing the new measured value of supply voltage (VD_meas) as new maximum value of the supply voltage (Max-VD_meas);
if the new measured value of supply voltage (VD_meas) to the device is smaller than the maximum (Max-VD_meas) of values of the supply voltage measured in connection with previous booting operations, keeping the maximum (Max-VD_meas) of values of the supply voltage measured in connection with previous booting operations stored for use in a next iteration; and
calculating the circuit offset error as the difference between:
the maximum value of the supply voltage (Max-VD_meas) over the series of booting operations; and
the output function of the battery voltage at full charge (f(V_BATT)); and charging the battery to maximize charging cycle based on calculated circuit offset in order to enhance operation of the hearing aid device.

2. The method of claim 1, further comprising:
detecting a number (n) of charging cycles the hearing aid has undergone at a respective booting operation, after turning on and booting the hearing aid; and
assessing whether the number (n) exceeds a set minimum number of charging cycles (n*).

3. The method of claim 2, wherein
if the number (n) of charging cycles does not exceed the set minimum number of charging cycles (n*), the step of measuring a new value of supply voltage (VD_meas) to the device is further performed, wherein
if the new measured value of supply voltage (VD_meas) to the device is larger than the maximum (Max-VD_meas) of values of the supply voltage measured in connection with previous booting operations, the new measured value of supply voltage (VD_meas) is stored as new maximum value of the supply voltage (Max-VD_meas);
if the new measured value of supply voltage (VD_meas) to the device is smaller than the maximum (Max-VD_meas) of values of the supply voltage measured in connection with previous booting operations, the maximum (Max-VD_meas) of values of the supply voltage measured in connection with previous booting operations is kept stored for use in a next iteration;
whereas, if the number (n) of charging cycles exceeds the set minimum number of charging cycles (n*), a further iteration of measuring a new value of supply voltage (VD_meas) to the device is skipped and the circuit offset error is calculated as the difference between:
the maximum value of the supply voltage (Max-VD_meas) over the series of booting operations; and
the output function of the battery voltage at full charge (f(V_BATT)).

4. The method of claim 2, wherein the detection of, and the assessment on, the number (n) of the charging cycles is carried out at the end of the iterative measuring process of a supply voltage (VD_meas) to the device and before performing the calculation of the circuit offset error, such that
the iterative measuring of a supply voltage (VD_meas) to the device is always carried out, in connection with each booting operation; and
only if the number (n) of charging cycles exceeds the set minimum number of charging cycles (n*), the iterative measuring process is stopped and the circuit offset error is calculated as the difference between:
the maximum value of the supply voltage (Max-VD_meas) over the series of booting operations; and
the output function of the battery voltage at full charge (f(V_BATT)).

5. The method of claim 2, further comprising maximizing a usage per charging cycle of the rechargeable battery by taking into account the calculated the circuit offset error.

6. The method of claim 1, further comprising setting an initial value of the supply voltage, before any measuring thereof is executed, equal to a pre-set trial value and/or to zero.

7. The method of claim 1, further comprising deriving a state of charge of the battery based on the nominal value for the battery voltage at full charge (V_BATT) and on the calculated circuit offset error.

8. The method of claim 1, wherein the turning on and booting the hearing aid is carried out by an end user of the device.

9. A hearing aid, the hearing aid comprising:
a rechargeable battery that powers an electronic circuitry of the hearing aid, the electronic circuitry introducing a circuit offset error to a measure of a battery voltage of the rechargeable battery; and
a voltage tuning system configured to compensate for the circuit offset error to the measure of the battery voltage of the rechargeable battery by:
assuming a nominal value for the battery voltage at full charge (V_BATT) and a correlated output function of the battery voltage at full charge (f(V_BATT));
iteratively measuring a supply voltage (VD_meas) to the device over a series of booting operations of the device, comprising for each booting operation the steps of:
turning on and booting the hearing aid;
measuring a new value of the supply voltage (VD_meas) to the device, wherein
if the new measured value of supply voltage (VD_meas) to the device is larger than a maximum (Max-VD_meas) of values of the supply voltage measured in connection with previous booting operations, storing the new measured value of supply voltage (VD_meas) as new maximum value of the supply voltage (Max-VD_meas);
if the new measured value of supply voltage (VD_meas) to the device is smaller than the maximum (Max-VD_meas) of values of the supply voltage measured in connection with previous booting operations, keeping the maximum (Max-VD_meas) of values of the supply voltage measured in connection with previous booting operations stored for use in a next iteration; and calculating the circuit offset error as the difference between:
- the maximum value of the supply voltage (Max-VD_meas) over the series of booting operations; and
- the output function of the battery voltage at full charge (f(V_BATT)), wherein the voltage tuning system uses the calculated circuit offset error for compensation for operating the hearing device, and wherein the voltage tuning system includes voltage detection unit to measure voltage; and charging the battery to maximize charging cycle based on calculated circuit offset in order to enhance operation of the hearing aid device.

10. The hearing aid of claim 9, wherein the voltage detection unit is further configured to cooperate with an electronic processing unit of the device to calculate the circuit offset error.

11. The hearing aid of claim 9, further comprising a charging cycle detection means to detect a number of charging cycles undergone by the rechargeable battery.

* * * * *